UNITED STATES PATENT OFFICE.

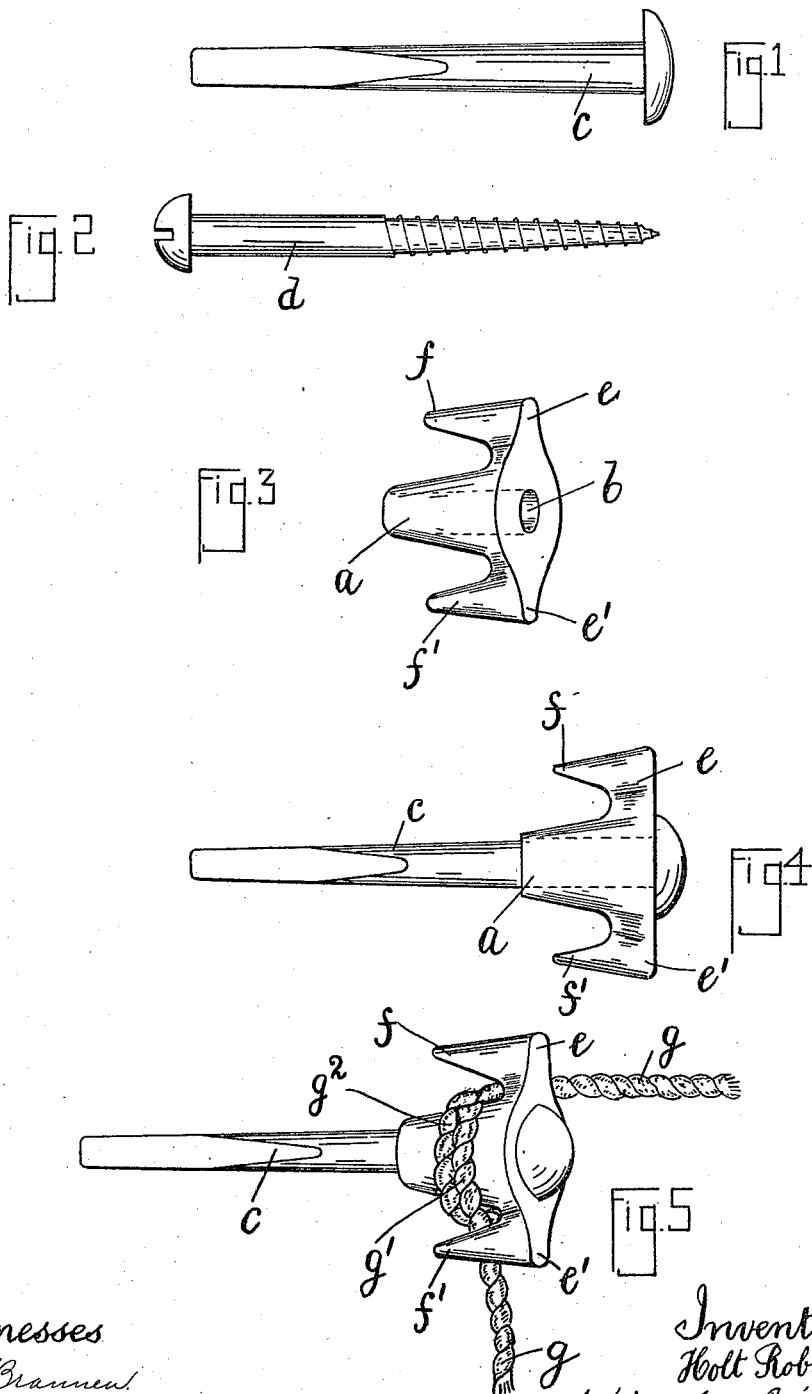

HOLT ROBINSON, OF BRADFORD, ENGLAND.

CLOTHES-LINE HOOK AND FASTENER.

1,172,835. Specification of Letters Patent. Patented Feb. 22, 1916.

Application filed April 25, 1914. Serial No. 834,386.

*To all whom it may concern:*

Be it known that I, HOLT ROBINSON, a subject of the King of Great Britain, and resident of 75 Harewood street, Bradford, in the county of York, England, have invented a certain new and useful Improvement in Clothes-Line Hooks and Fasteners, of which the following description, wherein reference is made in the accompanying sheet of drawings, is a specification.

My invention relates to the class or kind of hook or fastener for securing clothes lines, cords, small ropes and the like, for well known purposes; which consists of a rotary member mounted upon a binding or supporting nail or spindle which may be driven into or secured upon a wall, post, or the like, and my said invention consists in forming said rotary member of such a character or shape as will permit the cord or the like to be wound upon its hub part, while appropriate inclined projecting pieces which extend from radiating arms on said hub part, receive the cord in such a manner that the tension thereon causes said cord to jam or become wedged firmly in the narrow spaces that exist between the hub part and the projections.

The formation of the rotary member with the parts described although firmly securing the cord or the like, will readily permit the detachment of same from its grip when the tension of said cord is removed.

In carrying my invention into effect I make use of the devices illustrated in the accompanying sheets of drawings wherein—

Figures 1 and 2 represent respectively a common nail and screw of the character that may be employed in connection with my improved device. Fig. 3 shows my improved device in perspective. Fig. 4 is a side elevation illustrating my device mounted upon a common nail. Fig. 5 is a perspective view illustrating the method in which the cord is wound around and crossed upon my device so that same may act as hereinafter described.

My device consists of a rotary member having a central hub $a$ of cylindrical form with an opening $b$ for the reception of the common nail $c$ or screw $d$ so that when said nail or screw is inserted therein same may be driven into a post or a wall or other part that may be found desirable to mount same upon. From the hub $a$ are the radiating arms $e$, $e'$ with claws $f$ and $f'$ respectively. These claws are made of tapering shape so that the spaces between their outer ends and the hub $a$ are greater than are the spaces between the inner ends of same and said hub. On a cord, as $g$, being made to take into said spaces as when it is wound around the hub $a$ and crossed upon itself, the pull on said cord $g$ has the effect of wedging its inner coil $g'$ by the outer coil $g^2$ between the prongs $f$ and $f'$ and the hub $a$ so that the cord $g$ is thereby secured and firmly held. No knots or other additional devices are necessary for securing said cord, since the greater the strain thereon the firmer will be the gripping actions of the parts described. The member $a$ is free to rotate around the circular shank of its support, in order that the cord, or the like, may be applied thereto irrespective of the position of said member.

Such being the nature and object of my said invention, what I claim is:—

1. A hook or fastener of the character described comprising a supporting member, and a hub rotatably mounted upon said supporting member and provided with claws spaced therefrom and extending approximately parallel therewith.

2. A hook or fastener of the character described comprising a supporting member, and a hub rotatably mounted upon said supporting member and provided at one end with radiating arms having tapered claws extending approximately parallel with said hub.

In testimony whereof I have signed my name to this specification in the presence of two subscribing witnesses.

HOLT ROBINSON.

Witnesses:
NEWTON M. BROWN,
SAMUEL HEY.

Copies of this patent may be obtained for five cents each, by addressing the "Commissioner of Patents, Washington, D. C."